United States Patent
Fang et al.

(10) Patent No.: US 6,606,127 B1
(45) Date of Patent: Aug. 12, 2003

(54) SYSTEM AND METHOD FOR SYNCHRONIZING, STORING AND ACCURATELY REPRODUCING VIDEO SIGNALS

(75) Inventors: William C. Fang, Rockwell, TX (US); Raymond S. Horton, McKinney, TX (US)

(73) Assignee: Enseo, Inc., Richardson, TX (US)

(*) Notice: Subject to any disclaimer, the term of this patent is extended or adjusted under 35 U.S.C. 154(b) by 390 days.

(21) Appl. No.: 09/592,468

(22) Filed: Jun. 9, 2000

Related U.S. Application Data

(60) Provisional application No. 60/139,050, filed on Jun. 10, 1999.

(51) Int. Cl.[7] .................. H04N 9/44; H04N 9/475; H04N 9/74; H04N 9/76; H04N 3/27; G09G 5/00
(52) U.S. Cl. .................. 348/500; 348/516; 348/554; 348/584; 348/598; 345/213
(58) Field of Search .................. 348/515, 500, 348/512, 513, 514, 516, 517, 508, 554, 584, 598, 588, 538; 375/355, 357, 362; 345/213, 638

(56) References Cited

U.S. PATENT DOCUMENTS

| | | | |
|---|---|---|---|
| 5,202,761 A | * 4/1993 | Cooper | 348/515 |
| 5,227,863 A | 7/1993 | Billbrey et al. | |
| 5,414,566 A | * 5/1995 | Oba et al. | 360/13 |
| 5,635,960 A | * 6/1997 | Onagawa | 345/213 |
| 5,671,260 A | * 9/1997 | Yamauchi et al. | 375/372 |
| 5,805,233 A | 9/1998 | West | |
| 5,929,923 A | * 7/1999 | Yamauchi et al. | 348/538 |
| 5,977,989 A | * 11/1999 | Lee et al. | 345/503 |
| 6,037,994 A | * 3/2000 | Bae | 348/510 |
| 6,101,591 A | * 8/2000 | Foster et al. | 711/219 |
| 6,141,057 A | * 10/2000 | Cooper | 348/515 |
| 6,191,823 B1 | * 2/2001 | Ahn | 348/554 |
| 6,437,834 B1 | * 8/2002 | Tagami | 348/705 |

FOREIGN PATENT DOCUMENTS

| | | |
|---|---|---|
| EP | 0 734 011 | 9/1996 |
| EP | 0 807 923 | 11/1997 |
| WO | WO 98 48570 | 10/1998 |

* cited by examiner

*Primary Examiner*—John Miller
*Assistant Examiner*—Paulos Natnael
(74) *Attorney, Agent, or Firm*—Reed Smith Crosby Heafey LLP; John W. Carpenter

(57) ABSTRACT

A method and apparatus for synchronizing multiple signals is provided. The method and apparatus utilize the timing information of one of the multiple signals as a reference clock for synchronizing multiple signals. The method and apparatus utilize selectively gating the clocks of the other signal processing chains in order to allow control by the reference clock.

16 Claims, 4 Drawing Sheets

SYSTEM AND METHOD FOR SYNCHRONIZING, STORING AND ACCURATELY REPRODUCING VIDEO SIGNALS

CROSS REFERENCE TO RELATED APPLICATIONS

This application claims priority from U.S. Provisional Patent Application Serial No. 60/139,050, entitled System And Method For Synchronizing, Storing And Accurately Reproducing Video Signals, filed Jun. 10, 1999, which is incorporated herein by reference in its entirety.

BACKGROUND OF THE INVENTION

1. Field of the Invention

The present invention relates generally to the field of digital signal processing, and more specifically to the field of accurately storing, reproducing and synchronizing video and/or audio signals.

2. Description of the Background Art

In the video signal processing field, special challenges are presented where a variety of video signals are to be processed and combined. For example, a broadcaster such as The Weather Channel may wish to present a viewer with a composite image comprising a live video feed from a nationally-known landmark and a computer-generated graphic overlay, including forecasted high and low temperatures across the country.

Complications and opportunities to enhance the viewing experience in this exemplary scenario arise in at least two particularly relevant respects. First, where one signal is lost or interrupted, there is a need to preserve the quality of the overall image, and thereby maintain the usefulness of the second signal and the attention of the viewer. If, for example, the live landmark feed is lost, the user may be more likely to continue viewing the graphic data feed if a high-quality repetition of some segment of the already-displayed background feed is quickly substituted for the lost signal.

Second, when such a failure occurs, or even when both signals are fully functional and processed as intended by the broadcaster or system designer, it is desirable to maximize the quality of the composite image by properly synchronizing the two (or some greater plurality) of signals and, where appropriate, reproducing any stored signal as accurately as possible.

There is therefore a need in the art of digital signal processing for a method and system of accurately storing, reproducing and synchronizing audio and video data signals.

SUMMARY OF THE INVENTION

To address the shortcomings of the available art, the present invention provides a method and system for storing digital sampling data, such as sampling clock signal phase and frequency (referred to generally herein as decoder reference signal or "DRS" data), along with commonly stored pixel-related data such as luminance (e.g., the "Y" component of a YCrCb signal) and chrominance (the "C" signal component), in order to offset common signal decoding and re-encoding errors, such as ringing, overshooting, cross-chrominance and cross-luminance.

It is therefore a first advantage of the present invention to provide a method and system for storing and utilizing information related to how data is manipulated, such that the manipulated data may be more accurately returned to its original form.

A second advantage of the present invention is the reduction of the occurrence of common decoding and re-encoding signal flaws, such as ringing, overshooting, cross-chrominance, cross-luminance, and high differential phase levels, by precisely storing and utilizing the original decoding phase and frequency information when a decoded signal is re-encoded.

It is a further advantage of the present invention to provide a method and system for linking the pixel clocks of a plurality of signals to ensure the signals are substantially synchronized.

It is a still further advantage of the present invention to provide a method and system providing synchronization of a plurality of signals, substantially reducing timing errors without a phase lock loop.

It is therefore a still further advantage of the present invention to provide a method and system for synchronizing a plurality of signals by periodically controlling a first signal's reference source, such as a pixel clock, to control the timing of a second signal. In a preferred embodiment, the first signal's reference source is a pixel clock signal gated to be accessed only when either of the vertical or horizontal synchronization signals is active and a field match is found.

It is yet another advantage of the present invention to provide a method and system for gating a first signal's pixel clock signal in a manner based upon reducing the anticipated pixel count for the signal sufficient to mitigate any timing difference between the first and second signals during a predetermined period. In a preferred embodiment, the pixel count is decreased by the number of pixels contained in one line less than the actual line count of the signal, the predetermined period being one vertical scan time.

Still another advantage of the present invention is the provision of a method and system for selectively utilizing phase and frequency information relative to the digitization of a first signal when re-encoding the first signal or a modified version of the first signal.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

Figure 1:
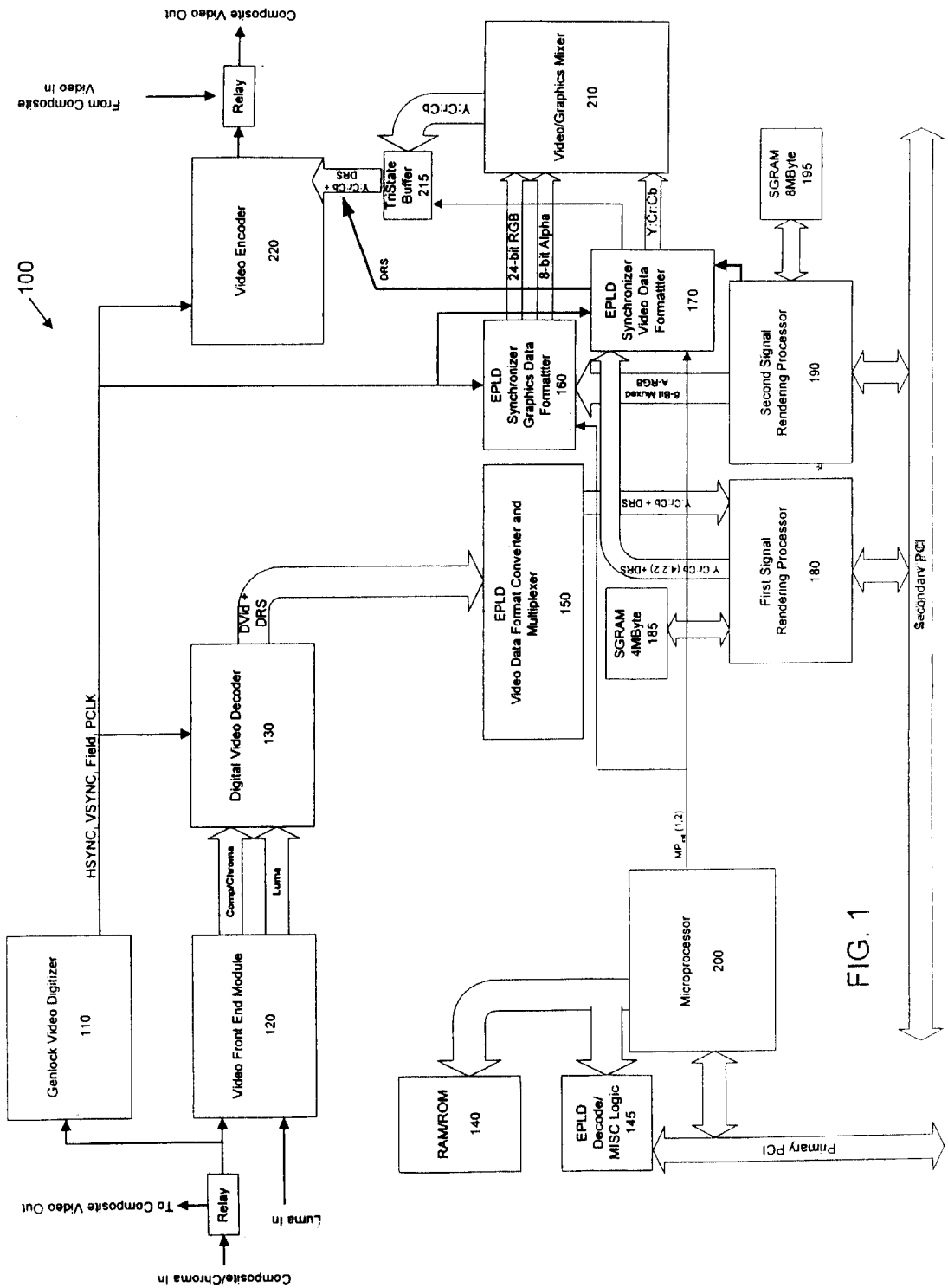
FIG. 1 is block and signal flow diagram of a preferred embodiment of the present invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF A PREFERRED EMBODIMENT

Referring first to the block diagram of FIG. 1, a circuit 100 is provided for implementing the method and system of the present invention. Two signal paths, first through genlock 110 and second through front-end module 120, are provided to process and forward the incoming composite video signal. An integrated input signal including both chrominance and luminance data preferably comes through genlock 110, while a signal separately feeds chrominance and luminance data to digital video decoder 130. A preferred genlock 110 is the TMC 2072 digitizer, available from Fairchild Semiconductor. A preferred front end module is the FE100M, available from MMC. A preferred digital video decoder 130 is the TMC22153, available from Fairchild Semiconductor.

Decoder 130 generates digital video signals and DRS words, which are forwarded to programmable logic device 150, which in turn forwards, as illustrated, a YCrCb plus DRS signal to first signal rendering processor 180. It should be noted that, while device 150 is preferably implemented as a programmable device such as an EPLD, a hard wired device or ASIC having the preferred capabilities could be easily substituted for the illustrated element. A presently preferred rendering processor 180 and 190 is the Verite 2200 available from the Rendition division of Micron Technology, Inc. The DRS words preferably include at least information regarding the phase and frequency of the reference video subcarrier.

First signal rendering processor 180 preferably stores the YCrCb and DRS data in attached synchronized graphics random access memory (SGRAM) 185, although any short- or long-term stable device (even a hard drive remotely located from circuit 100) may be substituted therefore without substantially altering the function and advantages of the present invention.

It should be noted that the present system therefore provides a system and method for storing data being descriptive of the digitization process of the pixilated data, in addition to the storage of the pixilated data itself, thereby providing improved data for re-encoding the pixilated data. Such multi-level data storage and accessibility provides improved re-encoding characteristics during normal system operation, in addition to the ability to provide high-quality buffered signals when necessary, such as displaying a buffered frame when there is a glitch or delay in the input signal due to a satellite transmission failure or other transmission complication, as will be understood by those skilled in the relevant art.

Returning to FIG. 1, after the data is stored, it is then forwarded to video data formatter 170, also preferably implemented on a programmable device, but easily implemented in hard-wired or ASIC form, as described above with reference to element 150. Formatter 170 is illustrated with greater detail in FIG. 2, as discussed below.

A second signal rendering processor 190, preferably having an affiliated SGRAM 195, forwards a second signal (in the provided example, though not necessarily, a digital graphics signal) to formatter 160, which forwards the appropriate graphics data (including RGB and Alpha components, as shown) to mixer 210. In order to make use of the stored DRS data, it must be re-introduced into the output data stream without effecting the function of mixer 210. The DRS data from the first signal rendering processor is therefore separated out from the pixel data by video formatter 170 and the pixel data forwarded to mixer 210 to be mixed with the graphics data from element 160.

Video formatter 170 then preferably converts the DRS data from 8-bit bytes to 4-bit nibbles, which are then reintroduced into the now-mixed video/graphics data signal, destined for encoder 220, by controlling tri-state buffer unit 215 and internal tri-state buffers within video formatter 170. Buffer 215 thereby acts as a multiplexer, reintroducing the DRS data into the encoded signal according to control signals received from formatter 170, as will be understood by those skilled in the art to which the present invention pertains. Also, both formatters 160 and 170 receive control signals from microprocessor 200, preferably an i960 Microprocessor available from Intel, Inc., preferably having an associated RAM/ROM 140 and external logic element 145, as illustrated in FIG. 1.

Having described the method and system for storing DRS data to improve encoding accuracy, we turn next to the associated structure and steps required for synchronizing the function of second signal rendering processor 190 to the timing of the genlocked video signal, dictated by signal PCLK, without the use of complicated phase lock loop circuitry, as has been used in the available art.

Figure 2:
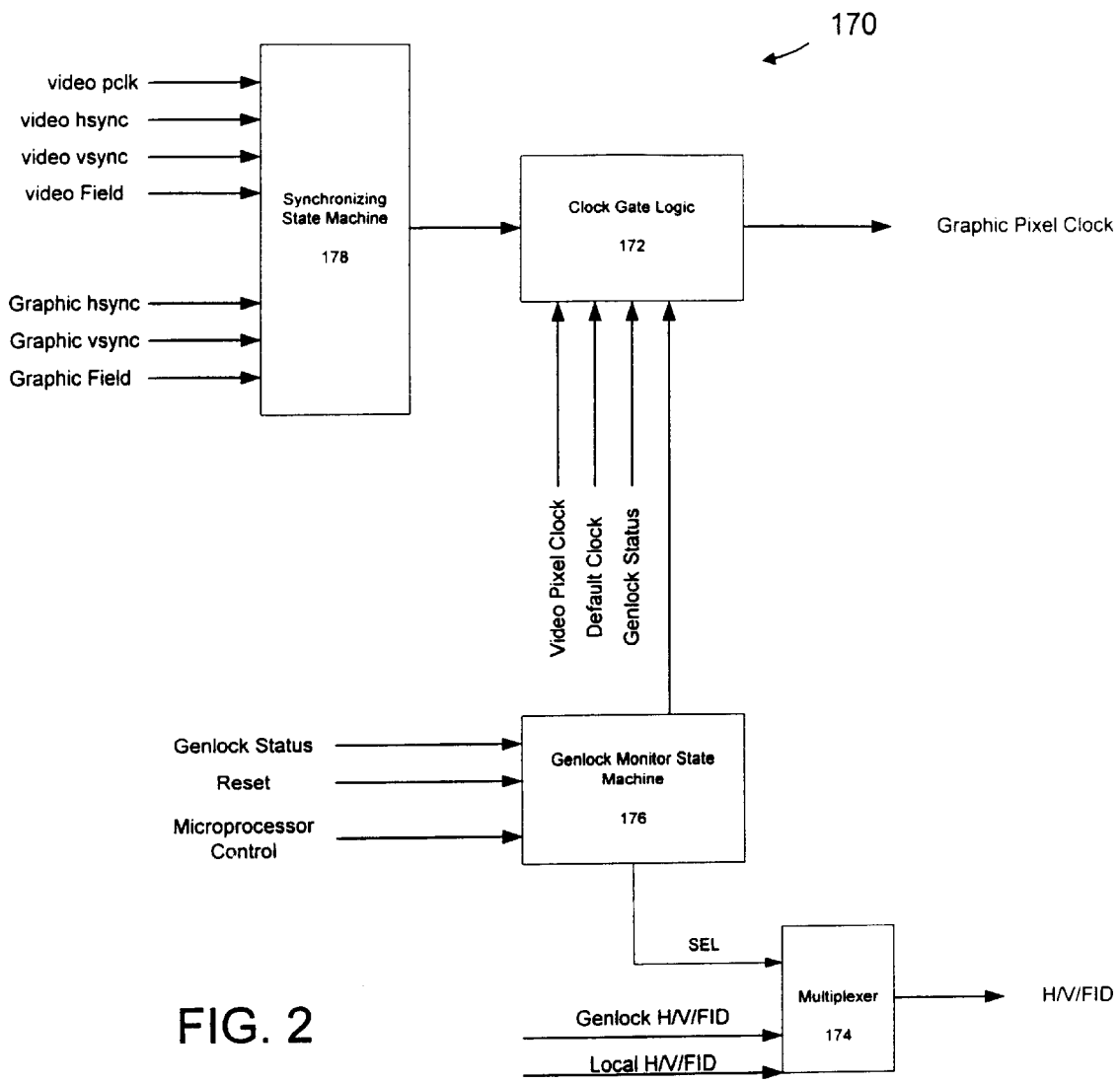
FIG. 2 is a block diagram of a video timing synchronization component illustrated in FIG. 1.
Figure 3:
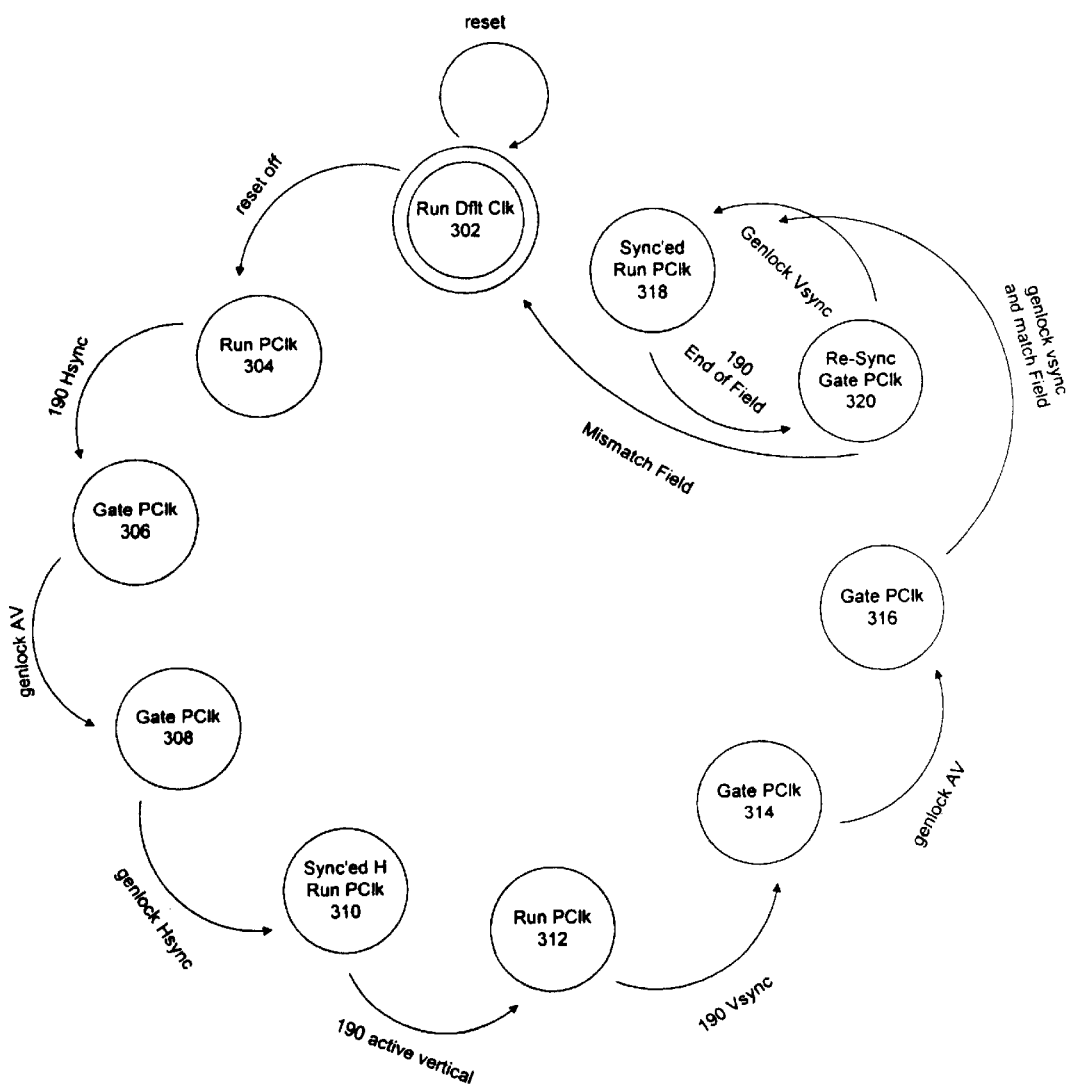
FIG. 3 is state diagram illustrating the method and system of the present invention's monitoring and selective gating of a first signal's pixel clock reference signal to control the timing of a second signal.

Referring next to FIG. 2, video data formatter 170 includes multi-input clock logic gate 172, multiplexer 174, monitor state machine 176 (described in further detail in FIG. 4) and synchronizing state machine 178 (described in further detail in FIG. 3). The incoming composite or other analog video signal, processed by first rendering processor 180, includes lines HSYNC, VSYNC, PCLK, and Field Sense. Similarly, the graphics signal processed by second rendering processor 190 includes HSYNC, VSYNC, and Field Sense. Processor 190 depends for independent functionality upon an internally generated clock signal Default Clock, shown in FIG. 2.

Figure 4:
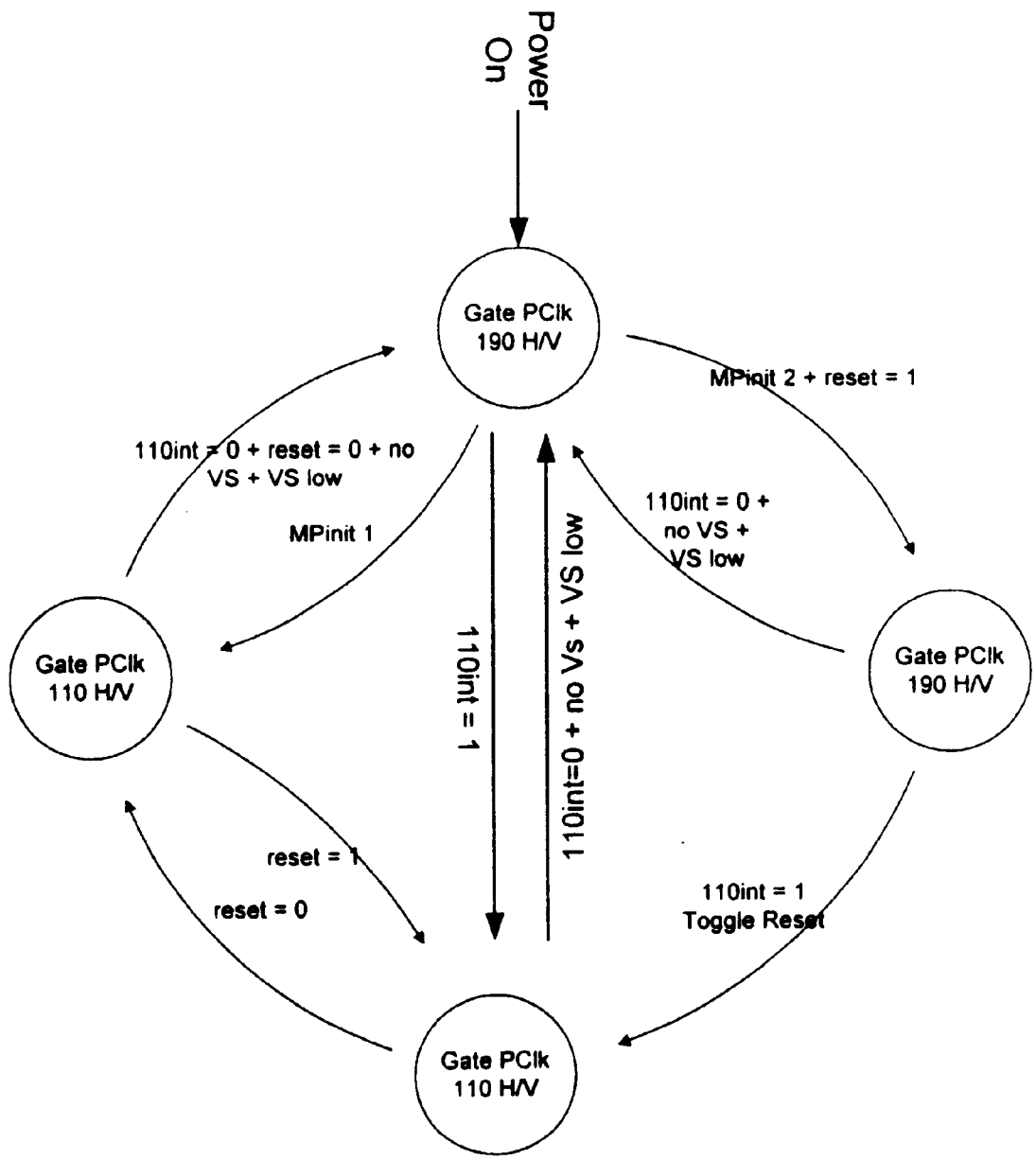
FIG. 4 is state diagram further illustrating the method and system of the present invention's monitoring and selective gating of a first signal's pixel clock reference signal to control the timing of a second signal.

To synchronize the function of processor 190 to that of processor 180, clock signal PCLK is selectively substituted for signal Default Clock in a manner triggered by signals HSYNC and VSYNC. The synchronization control steps implemented by the system of the present invention are illustrated in FIG. 3. It should be noted that the steps illustrated in FIGS. 3 and 4 are preferably implemented as a state machine, wherein each element of the figure represents a binary flag or bit, which functions according to the illustration. However, the flow of steps illustrated may alternatively be implemented as software executed by a processing unit such as microprocessor 200. To better illustrate this equivalence, the diagrams are described as a series of steps, though those skilled in the pertinent art will understand that each element may just as easily represent a bit set high or low according to the state of the illustrated signal. Moreover, the preferred VHDL code required to implement the state machines of FIGS. 3 and 4 can be found in Appendices A and B, respectively, which are incorporated herein in their entirety.

Commencing with step 302 in FIG. 3, while signal reset is active, second signal rendering processor 190 runs in standby mode, retrieving timing signals from signal Default Clock. This state continues until signal reset is deactivated, at which time signal POLKA assumes the required clocking function. When graphics signal SYNC arrives via processor 190 (from either SGRAM 195 or an alternate source connected to the secondary CPI bus), signal PCLK is gated off at step 306 and remains deactivated through step 308, until genlock 110 provides an active video signal and HSYNC, at which time PCLK is again activated at step 310 and the two video signals are synchronized. Synchrony continues through acquisition of an active vertical signal from processor 190 at step 312, after which PCLK is again gated at step 314 after acquisition of signal VSYNC from processor 190. PCLK gating continues through the next acquisition of an active video signal and properly matched Field Sense signal from genlock digitizer 110 at step 316, after which PCLK is reactivated at step 318. Synchrony continues until the end of the field is reached, when PCLK is again gated at step 320. Thereafter, synchronization is reestablished with acquisition of the next genlock VSYNC signal, returning to step 318. The cycle of steps 318 and 320 continues thereafter until a mismatched field is detected (if, for example, a video or graphics signal source is replaced) at which time reset mode recommences and the internal clock of processor 190 resumes control at step 302.

It should be noted that a key element enabling proper synchronization of the video and graphics signals is the provision of buffered timing conditions enabling the synchronization of control signals. Preferably, a timing parameter register CRTCVert (not shown, but preferably located within processor 190), controlled by microprocessor 200, stores the pixel line count for the preferred vertical signal component (although any signal component would be suitable). The register enables specification of the total number of lines per field, dictating the timing of the active, back porch, front porch, and synchronization timing signals. To synchronize genlock device 110 and processor 190, the vertical front porch timing provided by this register preferably provides a full line "buffer" period to re-acquire synchronized clocking signal (as described with reference to steps 318 and 320 above).

Turning next to FIG. 4, wherein genlock timing monitor state machine 176 is illustrated, the start up sequence for processor 190 and genlock 110 is provided. Microprocessor-supplied control signals MPinit1 and MPinit2, shown in FIG. 1, function to initiate state machine 176. Microprocessor 200 determines the locking state of genlock 110 and selects the video-timing source, either an internal timing signal or a genlock-generated timing signal. Once state machine 176 is initialized, microprocessor 200 will continuously monitor the state of genlock 110 and executes any necessary change to the timing signal source. When genlock 110 provides a sufficiently clean signal, genlock timing signals are utilized. Otherwise, the processor 190's internal timing signal is used. In a preferred embodiment, the horizontal, vertical, and pixel clock video signal components are continuously monitored to ensure each processor receives the appropriate clock signal for optimal synchronization, as described above.

The present invention therefore provides a novel method and system for synchronizing, storing and accurately reproducing processing video signals. Although the present invention has been shown and described with respect to preferred embodiments, various changes and modifications lie within the spirit and scope of the claimed invention. Thus, the corresponding structures, materials, acts, and equivalents of all means or step plus function elements in the claims in this patent application or any applications claiming priority therefrom are intended to include any structure, material, or acts for performing the functions in combination with other elements as specifically claimed.

What is claimed is:

1. A method of generating a composite video signal from at least two other video signals comprising
   providing an analog video signal;
   providing a digital video signal;
   determining a clock phase and a clock frequency of the analog video signal;
   synchronizing the digital video signal with the analog video signal using the clock phase and a clock frequency of the analog video signal;
   combining the analog video signal and the digital video signal to generate a composite video signal; and
   providing the composite video signal according to the clock phase and clock frequency of the analog video signal;
   wherein synchronizing the digital video signal with the analog video signal comprises:
      storing the analog video signal;
      storing the digital video signal;
      outputting the analog video signal, after storing the analog video signal, according to the clock phase and clock frequency of the analog video signal; and
      outputting the digital video signal, after storing the digital video signal, according to the clock phase and clock frequency of the analog video signal.

2. The method of claim 1 further comprising determining line and frame synchronization information from the analog video signal.

3. The method of claim 2 wherein providing the composite video signal comprises providing a portion of the composite video signal representing a horizontal line on a display in response to receiving line synchronizing information.

4. A method of generating a composite video signal from at least two other video signals comprising
   providing an analog video signal;
   providing a digital video signal;
   determining a clock phase and a clock frequency of the analog video signal;
   synchronizing the digital video signal with the analog video signal using the clock phase and a clock frequency of the analog video signal;
   combining the analog video signal and the digital video signal to generate a composite video signal; and
   providing the composite video signal according to the clock phase and clock frequency of the analog video signal;
   wherein providing the composite video signal comprises buffering the composite video signal and outputting the composite video signal to a video encoder according to the clock phase and clock frequency of the analog video signal.

5. The method of claim 4 wherein determining a clock phase and a clock frequency of the analog video signal comprises generating a decoder reference video signal comprising information representing the clock phase and the clock frequency of the analog video signal and wherein outputting the composite video signal to the video encoder comprises outputting the composite video signal to the video encoder in response to receiving the decoder reference video signal.

6. The method of claim 5 further comprising determining luminance and chrominance information regarding the analog video signal, wherein the digital video signal comprises luminance and chrominance information and wherein combining the analog video signal and the digital video signal to generate a composite video signal comprises combining the luminance and chrominance information for both the analog video signal and the digital video signal.

7. An apparatus for synchronizing multiple signals of a same media type, the multiple signals being used to generate a composite signal, the apparatus comprising a genlock digitizer that receives an analog signal and that provides timing information regarding the analog signal;

a decoder that receives the analog signal and timing information regarding the analog signal and that provides first digital data and the timing information regarding the analog signal;

a second digital data source that provides second digital data according to the timing information of the analog signal;

a first data formatter that receives the first digital data and timing information regarding the analog signal and that provides the first digital data and the timing information according to the timing information;

a second data formatter that receives the timing information and second digital data and that provides the second digital data according to the timing information; and a mixer that receives the first digital data and the second digital data and that provides composite digital data.

8. The apparatus of claim 7 wherein the first digital data and the second digital data comprise video signals, the apparatus further comprising a front end processor that receives the analog signal and an output that provides luminance and chrominance information regarding the analog signal.

9. The apparatus of claim 7 further comprising a data format converter and multiplexer that receives the first digital data and timing information regarding the analog signal and that provides a multiplexed signal comprising the first digital data and timing information regarding the analog signal, and an analog rendering processor that receives the multiplexed signal and that provides the multiplexed signal to the analog data formatter.

10. The apparatus of claim 7 further comprising a buffer that receives the composite digital data and the timing information, and that provides the composite digital data to the input of an encoder according to the timing information.

11. The apparatus of claim 10 wherein the analog data formatter comprises a synchronization state machine that receives the timing information and that provides composite timing information, a genlock monitor state machine that receives the control information and that provides status information, and clock gate logic that receives the composite timing information and that provides clock information to the buffer that controls operation of the buffer.

12. An apparatus for generating a composite signal from at least two other signals comprising:

means for providing an analog video signal;

means for providing a digital video signal;

means for determining timing information regarding the analog video signal;

means for synchronizing the digital video signal with the analog video signal using the timing information of the analog video signal;

a mixer that receives the analog video signal and the digital video signal and that generates a composite video signal;

means for storing the analog video signal;

means for storing the digital video signal;

means for outputting the analog video signal, after storing the analog video signal, according to the clock phase and clock frequency of the analog video signal; and means for outputting the digital video signal, after storing the digital video signal, according to the clock phase and clock frequency of the analog video signal.

13. An apparatus for generating a composite signal from at least two other signals comprising:

means for providing an analog video signal;

means for providing a digital video signal;

means for determining timing information regarding the analog video signal;

means for synchronizing the digital video signal with the analog video signal using the timing information of the analog video signal;

a mixer that receives the analog video signal and the digital video signal and that generates a composite video signal; and a buffer that receives the composite video signal and outputs the composite video signal to an encoder according to the timing information of the analog video signal.

14. The apparatus of claim 13 wherein the means for determining the timing information of the analog video signal comprises means for generating a decoder reference signal comprising information representing the timing information of the analog video signal.

15. An apparatus for generating a composite signal from at least two other signals comprising:

means for providing an analog video signal;

means for providing a digital video signal;

means for determining timing information regarding the analog video signal;

means for synchronizing the digital video signal with the analog video signal using the timing information of the analog video signal; and a mixer that receives the analog video signal and the digital video signal and that generates a composite video signal;

wherein the means for determining timing information regarding the analog video signal comprises line and frame synchronization information from the analog video signal.

16. An apparatus for generating a composite signal from at least two other signals comprising:

means for providing an analog video signal;

means for providing a digital video signal;

means for determining timing information regarding the analog video signal;

means for synchronizing the digital video signal with the analog video signal using the timing information of the analog video signal;

a mixer that receives the analog video signal and the digital video signal and that generates a composite video signal; and means for determining luminance and chrominance information regarding the analog video signal;

wherein:
the digital video signal comprises luminance and chrominance information; and
the mixer combines the analog video signal and the digital video signal to generate a composite video signal comprises combining the luminance and chrominance information for both the analog video signal and the digital video signal to generate the composite video signal.

* * * * *